United States Patent [19]
Pinschmidt, Jr. et al.

[11] Patent Number: 5,519,093
[45] Date of Patent: May 21, 1996

[54] SYNTHESIS OF AMINE FUNCTIONAL CO-AND TERPOLYMERS

[75] Inventors: Robert K. Pinschmidt, Jr.; Khalil Yacoub, both of Allentown, Pa.

[73] Assignee: Air Products and Chemicals, Inc., Allentown, Pa.

[21] Appl. No.: 241,238

[22] Filed: May 11, 1994

[51] Int. Cl.$^6$ ........................................... C08F 8/12
[52] U.S. Cl. ...................... 515/353; 525/328.2; 525/368; 525/369
[58] Field of Search ................................. 525/353, 368, 525/369

[56] References Cited

U.S. PATENT DOCUMENTS

| | | | |
|---|---|---|---|
| 3,558,581 | 1/1971 | Beermann et al. | 260/89.7 |
| 4,504,640 | 3/1985 | Harada et al. | 526/193 |
| 4,774,285 | 9/1988 | Pfohl et al. | 525/60 |
| 4,880,497 | 11/1989 | Sigberg et al. | 162/135 |
| 4,978,427 | 12/1990 | Pfohl et al. | 162/168.2 |
| 5,064,909 | 11/1991 | Itagaki et al. | 525/344 |
| 5,155,167 | 10/1992 | Pinschmidt et al. | 525/60 |

*Primary Examiner*—Bernard Lipman
*Attorney, Agent, or Firm*—Mark L. Rodgers; William F. Marsh

[57] ABSTRACT

Amine functional polymers are prepared by polymerization of vinylamides with vinyl ester monomers. The resultant polymers are hydrolyzed under acid conditions and subsequently at least partially basified to the free-base amine. Byproduct salts are removed by precipitation or by extraction into an immiscible phase. The polymers made by this method are crosslinkable through reaction of the amine groups and are useful in high performance coatings, adhesives, binders and the like.

17 Claims, No Drawings

SYNTHESIS OF AMINE FUNCTIONAL CO-AND TERPOLYMERS

TECHNICAL FIELD OF THE INVENTION

The present invention relates to the synthesis and use of crosslinkable amine functional hydrophobic polymers.

BACKGROUND OF THE INVENTION

Growing quality, energy and environmental concerns have produced a drive to simultaneously reduce solvent emissions in coatings; improve coating performance, e.g., by post-crosslinking coating polymers; reduce toxicity; and reduce cure temperatures. In order to reduce solvent emissions, it is possible to employ aqueous or powder coatings, but this is usually accomplished at a high cost in performance, coating appearance, high cure temperature and storage stability or pot life.

Alternatively, solvent-borne coatings are widely used, but prepared at high solids to minimize solvent emissions and low molecular weight to give usable viscosities for spray or brush application. To provide good coating performance, e.g., solvent and water resistance, hardness, toughness, scratch resistance and the like, it is necessary to crosslink or cure the coating polymer after application to build a high molecular weight. Many technologies are known for doing this, but most suffer from one or more drawbacks, including slow and inefficient cure, high toxicity of reactive cure components, incompatibility with water, air or other coating components, high cost, low durability or poor storage or pot stability before coating application.

The most widely applicable functionality for achieving practical solutions to the problems of stability, high reactivity with a wide variety of crosslinking functionalities, low toxicity and efficient crosslinking is the primary amine group attached to an appropriate hydrophobic polymer or oligomer backbone. Such functionality is reactive with epoxides, isocyanates, amide/formaldehyde and other aldehyde condensates (aminoplasts), Michael acceptors, aziridines, acetylacetates, anhydrides, lactones and other active esters, ketenes and ketene dimers, aldehydes and ketones, coordinating transition metals, alkylating agents (or their polymeric equivalents) and acid halides, to name the more common reaction partners. Unfortunately, there are very few ways to prepare primary amine functional polymers and oligomers, especially using low cost, free-radically polymerizable monomers without introducing solvent sensitive or hydrolytically unstable functionalities to link the primary amine group to the polymer chain.

Amine functional low polymers and oligomers have been prepared by condensation polymerization of di- or higher amines with diacids or esters, diisocyanates, di- or higher functional Michael acceptors (e.g., ethylene glycol diacrylate (EGDA)), reduction of diolacrylonitrile adducts, or reductive amination of diols. These approaches are frequently limited to di- or lower amine functionality, are restricted in molecular weight and attainable $T_g$ and, as in the case of aminated diols, have hydrophilic backbones. Typical ethylenediamine-based products also have poor outdoor weatherability. Condensation reactions are also frequently difficult to control and give a broad molecular weight distribution, color, and in some systems, such as those based on isocyanates, are quite expensive. Many condensation-based di- and polyamines are found predominately only as high amine functional low molecular weight curatives.

Addition of explosive, carcinogenic and highly toxic aziridines to di- or polycarboxylic acids to produce amine functionality is known, but the real and perceived manufacturing difficulties and hazards of producing the products have kept these materials from wide acceptance.

The highly desirable option of preparing high performance polyamine functional polymers and oligomers via low cost free radical copolymerization of widely available vinyl monomers with an amine functional vinyl monomer has been severely constrained by the lack of a decently copolymerizable amine monomer. U.S. Pat. Nos. 4,504,640 and 5,155,167 use allyl and diallyl amines for this purpose, but these monomers are well-known to undergo severe chain transfer reactions and lead to serious polymerization inhibition, due to the well documented tendency of alkylamines, and especially allylamines, to lose a hydrogen atom alpha to the nitrogen. This tendency is somewhat suppressed in methacryloxyethyldialkylamine or their salts, but these monomers lack a reactive amine hydrogen for the subsequent crosslinking reaction. t-Butylaminoethyl methacrylate has also been proposed for this application, but contains only a highly hindered secondary nitrogen with poor reactivity and the monomer is expensive and unstable.

These deficiencies can, in principle, be alleviated by copolymerizing a protected vinyl functional amine monomer to appropriate co- and terpolymers and subsequently removing the blocking group. Vinylamides, imides and carbamates have been frequently proposed as polymerizable precursors to the attractive, but chemically unstable and unavailable 'vinylamine' monomer. Of these, higher amides, imides and N-vinylpyrrolidone are notoriously hard to hydrolyze under realistic conditions and success has frequently been achieved using toxic hydrazines under commercially unrealistic conditions. More recently, the use of N-vinyl-O-t-alkyl carbamates or N-vinylformamides has been proposed and demonstrated to allow hydrolysis to the amine functionality under commercially reasonable acid or (for the formamides) base conditions. Attempts to reduce the above concept to practice, however, resulted in severe difficulties. Co- and terpolymers of N-vinylformamide (NVF) are readily prepared with acrylates and, using appropriate monomer delay procedures, with methacrylates. However, on attempted deblocking of the amine group, a very rapid reaction occurs with neighboring ester groups to give a thermodynamically and kinetically favored γ-lactam with poor or no reactivity with most amine reactive functionalities. Recourse to styrene and related comonomers is an obvious next step, but NVF undergoes slow, inefficient and incomplete polymerization with styrene, mirroring the notoriously poor polymerizability of its close analog, vinyl acetate (VAc) with styrenics. A similar fate would seem likely using butadiene and its analogs. Use of ethylene (or, less advantageously, higher olefins) as the predominant comonomers is a possibility, but the requirement for extremely high pressures, 15,000 to 25,000 psi, is a strong disincentive for most manufacturers.

U.S. Pat. Nos. 4,774,285, 4,880,497 and 4,978,427 disclose the use of vinyl acetate (VAc) and vinyl propionate (VPr) copolymers of protected vinylamine monomers, including N-vinyl formamide. It is suggested that these polymers hydrolyze under acid to give hydrophobic amine functional polymers, however, it is taught in the examples that these systems undergo rapid ester hydrolysis under acid or base to give hydrophilic, water soluble amine functional PVOH. It is reported specifically in the above patents that acid hydrolysis in water provides extensive formamide and acetate hydrolysis to fully water soluble polymers with low residual PVAc or PNVF functionality. Although the above patents correctly predict some selectivity for formamide over VAc or VPr under acid hydrolysis to give ammonium functional vinyl ester copolymer, rapid intramolecular reaction of amine groups with neighboring ester groups in acrylate/vinylamines would lead one skilled in the art to anticipate an analogous rapid reaction with adjacent ester groups in vinyl ester copolymers to give vinylamide/vinyl alcohol functionality of little utility for high performance coatings.

U.S. Pat. No. 3,558,581 discloses poly-N-vinyl-N-methylamine and copolymers of N-vinyl-N-methylamine with compounds polymerizable under the action of a free-radical liberating catalyst. The polymers are formed by synthesizing the corresponding N-vinyl-N-methylformamide and subsequently hydrolyzing with mineral acids. U.S. Pat. No. 5,064, 9009 also disclosed vinylamide copolymers which are hydrolyzed and subsequently used in papermaking applications.

SUMMARY OF THE INVENTION

Amine functional polymers, crosslinkable through reaction of the amine groups, are prepared by copolymerization of vinylamides with branched vinyl ester monomers followed by acid hydrolysis. The hydrolyzed polymer is at least partially basified to the free-base amine and byproduct salts are removed by precipitation or by extraction into an immiscible phase. Additionally, two different branched vinyl esters can be used in the reaction to form a terpolymer with the vinylamide.

The resultant polymers, especially when crosslinked through postreaction of the amine groups with other moieties such as epoxides, isocyanates, Michael acceptors and the like, are useful in high performance coatings, adhesives and binders.

DETAILED DESCRIPTION OF THE INVENTION

We have discovered that branched vinyl ester (higher vinyl esters,(HVE))/vinylamide copolymers and terpolymers can be hydrolyzed selectively at the formamide linkages under acid conditions and at least partially neutralized; i.e., basified to the free base amine, with no or low branched ester hydrolysis or intramolecular transamiation to p-vinylamide/vinyl alcohol. Higher vinyl esters such as those selected from the group consisting of vinyl sec-alkyl carboxylates, vinyl tert-alkyl carboxylates (i.e., neo-acid esters) and mixtures thereof, are copolymerized with vinylamides under free radical conditions. These vinylester materials have the general structur $R^1R^2$ and $R^3C-C(=O)-CH=CH_2$ where $R^1$ is H or alkyl, $R^2$ and $R^3$ are alkyl and $R^1$, $R^2$, and $R^3$ are linear or branched alkyl chains containing to 18 carbons. Examples include vinyl esters of neodecansie, neononanoic, neooctononic, neopentanoic, and L-ethylhexanoic acid. Examples of suitable vinylamides include N-vinylformamide (NVF), N-methyl-N-vinylformamide, N-vinyl-O-alkyl carbamates, O-tertiaryalkyl carbamates, N-allyl analogs of N-vinyl monomers, and the like. A uniform terpolymer can be produced by using more than one vinyl ester in the reaction. In preparing terpolymers, it may be preferable to use a mixture comprising a highly branched neo-vinyl ester and a less sterically hindered vinyl ester, such as vinyl 2-ethylhexanoate, in order to achieve better hydrolysis and control Tg. Use of minor amounts of comonomers, e.g., ethylene, acrylic acid, vinyl sulfonic acid, and the like is also possible to modify Tg, adhesion, hydrophobicity, or steric bulk.

Polymerization is most conveniently carried out in a two phase mixture in water. Also useful is reaction in a lower alcohol solvent, such as methanol, ethanol, propanol or isopropanol due to the desirability of removing the formate groups as volatile formate esters in the following hydrolysis step. C-4 to C-10 alcohols, ketones (acetone, methylethyl ketone, MIBK), C-3 to C-12 esters, ethers such as tetrahydrofuran, alkanes, aromatics such as toluene and xylene, chorinated solvents and alcohol ethers or esters can also be used, either alone or in mixtures. The polymerization can be carried out from subambient temperatures to 150° C., preferably from 50° to 120° C. and most preferrably from 50° to 80° C. Lower temperatures, higher comonomer concentrations, low chain transfer solvents (e.g., t-butanol, water) and less catalyst favor high molecular weight polymers, while higher temperatures, chain transfer solvents (secondary alcohols, THF, added thiols), higher catalyst levels and low free monomer levels provide low molecular weights.

Free radical initiators which are generally known in the art can be used, including azo, perester, percarbonate, peroxide and redox systems (hydrogen peroxide or T-butylhydroperoxide plus a reducing agent, e.g., sodium formaldehyde sulfoxylate, bisulfite, ascorbate, or erythorbate. Persulfate frequently gives unreliable results when used with NVF and is disfavored. The reaction is typically inerted with nitrogen or argon to eliminate oxygen inhibition.

Reduction of residual monomer is important in preventing or minimizing color in the hydrolysis reaction. Standard methods include addition of extra catalyst and a higher reaction temperature at the end of the reaction. Other techniques include addition of scavenging comonomers, such as vinyl acetate, which can be copolymerized with the HVE/NVF and then vacuum or nitrogen gas stripped. Alternatively, the residual HVE and NVF can be reacted with an aldehyde scavenger, preferably a 1,2- or 1,3-diol, to give the thermodynamically favored cyclic acetal. Ehylene glycol, pentaerythritol, 2,2-dimethyl-1,3-propanediol, and analogous compounds are preferred. Although aldehyde scavengers have been previously suggested when using NVF, no prior use of diols has been found. In the preferred two phase suspension polymerization, unreacted NVF can be washed out of the bead product with water.

After the co- or terpolymer has been formed, it is hydrolyzed under acid conditions. Examples of acids suitable for hydrolysis include nitric, phosphoric, perchloric, chlorosulfonic, toluenesulfonic, trifluoromethanesulfonic, trifluoroacetic, and hydrobromic acids, and, in general, any strongly acidic organic or inorganic acid. Preferred acids include sulfuric (used in a mole to mole ratio based on NVF), methanesulfonic, HCl (anhydrous in non-aqueous solvents) and nitric. The acid is added in a concentration of 10% to 120% of N-vinylamide stoichiometry, with from 50% to 100% being preferred. Higher temperature hydrolysis reaction (100° C.) has been reported with NVF using water or weak acids at superatmospheric pressures.

Solvent selection in the hydrolysis step is an important variable. Although most stable solvents may be considered, it is prefered to use an alcohol or alcohol containing mixture. Low boiling primary alcohols, especially methanol, ethanol, 1-propanol and trifluoroethanol are preferred, although other alcohols such as Dowanol PM (1-methoxy-2-propanol) can be used. Less water soluble alcohols are useful in two phase hydrolysis reactions in water. Control experiments with isopropylformamide showed that acid consumption to give alkyl formate and the acid salt of the isopropylamine was faster (and cleaner) with unhindered alcohol (ethanol vs isopropanol or Dowanol). When using lower primary alcohols the reaction is preferably run at atmospheric pressure and 50°–100° C. Reaction at higher temperature or under partial vacuum allows for the use of higher boiling alcohols (C-4 to C-8), alkoxyethanols, ethylene glycol monoesters and the like to remove formate. Two phase hydrolysis in water allows formyl removal as formic acid. Admixture with toluene, xylene, ketones (MIBK, MEK, acetone), esters, especially acetate esters of lower alcohols, ethers (MTBE, THF, glymes), alkanes, nitriles (e.g., acetonitrile) and other common solvents can also be used.

After hydrolysis, the polymers are neutralized; i.e. basified to the free base amine. Basification can be done with strong or weak bases, including ion exchange resins, but is preferably carried out with alkoxides, hydroxides or oxides of mono and divalent alkali and alkaline earth metals. Examples of suitable basification agents include: sodium ethoxide, NaOH, CaO, MgO, $Na_2O$, $K_2O$, KOH, $Ca(OH)_2$, $Mg(OH)_2$, and the carbonates and bicarbonates of these elements. It is preferred that the product salt of the neutralization be insoluble in the solvent used. For example, CaO gives generally insoluble Ca salts of the acid which can be removed from the polymer solution by filtration or, more preferrably, centrifugation. CaO combined with methanesulfonic acid as the hydrolysis reagent gives particularly insoluble calcium methanesulfonate.

After the byproduct salts are removed, the polymers are useful in coatings and as adhesives and binders. Specifically, the polymers are useful in post crosslinked coatings, where they serve as the 'B' side and can be crosslinked by reaction with di- or higher functional epoxides, isocyanates, carbodiimides, acetylacetates, aldehydes (glyoxal, formaldehyde), aziridines, aminoplasts (e.g., amide/formaldehyde condensates), Michael acceptors (e.g., di- or higher acrylates of polyhydroxy materias such as trimethylolpropane).

The following examples are presented to better illustrate the present invention, and are not meant to be limiting.

METHOD 1

Synthesis of higher vinyl ester/NVF Copolymers via solution polymerization

Vinyl esters copolymerize readily with NVF to form random copolymers. In these reactions NVF is preferentially incorporated ($r_{VAc}$=0.31/$r_{NVF}$=4.62). This again aids in the consumption of residual NVF in the final product. NVF slows down the rate of polymerization somewhat, but molecular weights are normal. Vinyl acetate, preferably with a partial NVF delay, readily forms random copolymers with NVF, but base hydrolysis almost exclusively favors ester cleavage. Acid hydrolysis/neutralization without acetate hydrolysis is tricky, but formamide hydrolysis and neutralization with onty partial ester hydrolysis can be achieved. Basification, however, strongly promotes acetate hydrolysis to PVOH and aminolysis of ester groups to unreactive amide functionality.

The problem of preparing amine functional hydrophobic copolymers has been solved at least in part by preparing higher vinyl ester co- and terpolymers of NVF. Using vinyl sec- and vinyl tert-alkyl carboxylates with partial delay of the NVF, uniform copolymers have been prepared in water and a variety of solvents with low color, and molecular weights ($M_w$) in the 7,000–>200,000 range. $M_w$ of 7,000 to 60,000 is preferred.

Essentially complete conversion or removal of vinylformamide and vinyl ester monomer is quite important in preventing the formation of colored aldehyde condensates in the subsequent hydrolysis step. Use of less hindered vinyl ester at the end of the polymerization is beneficial for this. Vinyl pivalate (VP)NEH/NVF terpolymers are easier to finish then mixtures rich in vinyl esters.of bulky, highly branched acids (e.g. neo nonanoate). Addition of peroxide ($H_2O_2$ or TBHP) before the hydrolysis aids in preventing the formation of these colored condensates.

Vinyl ester/NVF polymers were hydrolyzed conveniently on the acid side using sulfuric or methanesulfonic acid. A 1:1 mole ratio of sulfuric acid to PNVF was used to achieve the desired level of formamide hydrolysis; crosslinking was not observed under our conditions. The hydrolysis reaction rate depends critically on temperature, steric bulk of comonomers and on solvent selection. The coproduct of hydrolysis in nonaqueous alcohol media is the formate ester of the alcohol. It forms significantly faster and is much more easily removed via distillation using a primary alcohol, such as EtOH, which forms low boiling formate. Removal of the formate is important to eliminate its back reaction with polymer amine groups after neutralization, which may regenerate p-vinylformamide.

Using neoacid vinyl esters,or vinyl sec alkylcarboxylates we saw little or no ester hydrolysis at 100° C. at 80% PNVF hydrolysis. Vinyl acetate and vinyl propronate copolymers show fairly good to poor stability of the acetate units under ester hydrolysis and poor to very poor stability on neutralization. Both formation of PVOH groups plus ester (transesterification) and aminolysis to give polymeric vinylacetamide or vinyl propronamide are observed.

The acid salt of the vinylamine copolymer was neutralized with CaO, which has the added advantage of producing low solubility Ca salts, especially with methanesulfonate. Removal of the solid salts by centrifugation provided the final amine functional polymer in solution.

EXAMPLE 1

Synthesis of Neo-9/NVF Copolymer

A sample of vinyl neo-nonanoate (neo-9)/NVF copolymer was synthesized in a 2 liter reactor kettle using ethanol as solvent at 65°±3° C. Ethanol, 300 g, was charged to the kettle while neo-9 (393.6g, 2.14 mole, 77.5 mole %) was fed via feed pump during 4.0 hrs. NVF (44.1 g, 0.621 mole, 22.5 mol %) was diluted with 50 g of ethanol and fed over 4.15 hrs. VAZO 52[2,2'-azobis-(2,4-dimethylvaleronitrile)]) (15 g) was dissolved in 150 g of ethanol (plus toluene to maintain solubility) and fed over 4.5 hrs to the reactor. At the end of reaction, a hazy polymer solution was observed, which became clear (completely soluble)in ethanol/toluene. GC analysis indicated unreacted monomer (1.3%). Polymer properties were as follows:

| Viscosity | % Solid | MW | Gardner Color |
| --- | --- | --- | --- |
| 120 cps | 46% | 16,900 | <2 |

Hydrolysis of neo-9/NVF copolymer was done in ethanol/toluene (50/50) at reflux using sulfuric acid (1.0/1.0 molar) based on 80% hydrolysis of NVF. Ethyl formate was distilled out with ethanol at 80°±5° C. while ethanol was fed to keep the concentration constant (50% solids).

At the end of reaction, GC analysis indicated very low ethyl formate in the pot. Most of the ethanol was distilled off. Titration analysis with $NaOCH_2CH_3$ in methoxypropanol indicated most of the strong acid had been consumed and 0.41 meg/g of solution of weak base was formed. The polymer solution was treated with CaO (1.0/1.0 molar based on acid). A white precipitate formed and was centrifuged to give a clear, but strongly colored polymer solution, pH~9.5. Titration analysis indicated 0.41 meq/g solution of weak base. $^1H$ NMR and $^{13}C$ NMR showed no ester hydrolysis before neutralization

EXAMPLE 2 (Comparative)

Synthesis and Hydrolysis of vinyl propionate (L-3.)/NVF Copolymer

A reaction vessel was charged with ethanol (294 g) and purged with $N_2$ for about 20 minutes. After purging, 10 percent of the VAZO 52 (1.225 g in 10 ml of toluene) feed mixture, 10 percent of the L-3 vinyl profonate (30.0 g, 0.3 moles) and 10 percent of the NVF (3.19 g, 0.045 mol) feed mixture were added to the reaction vessel, followed by heating at 68°–72° C. After 20 min at this temperature, 270.0 g (2.7 moles, 78.2 mole %) of L-3 was fed during 2.0 hrs and 28.74 g (0.404 moles, 11.7 mole %) of NVF were fed during 2.5 hrs. VAZO 52 (11.68 g, 3.4 wt. %) was fed over 6 hrs. Upon completion of the feeds, the mixture was allowed to react for an additional 60 minutes. The results were as follows:

| % Solids | Viscosity | MW | Tg | Gardner Color |
|---|---|---|---|---|
| 40% | 45 cps | 13,969 | 17° C. | <2 |

DSC analysis showed good agreement with calculated Tg by the Fox equation. $^{13}C$ NMR and $^1H$ NMR were in the range expected for the monomer composition (83 mole % ±3 vs. 85 mole % for L-3 and 17 mole % ±3 vs. 15 mole %).

Polymer Hydrolysis and Neutralization

This example shows that an acid hydrolyzed vinyl propionate/NVF copolymer (vinyl propionate/VAmoHX) has poor stability on basification, exhibiting loss of amine titer and solvent solubility and an increase in poly(vinyl alcohol).

Hydrolysis of L-3/NVF with $MeSO_3H$ in ethanol based on 80 mole % of NVF gave 54±3 mole % of hydrolysis to PVAm and no significant hydrolysis of L-3 based on $^{13}C$ NMR and $^1H$ NMR. The average of five non-aqueous titration analyses ($NaOCH_3$ in MeOH) showed 75 wt. % of PNVF converted to PVAm based on meq of weak base present in the polymer solution.

A sample of the polymer solution was basified to pH 10.9 with CaO, the solid was centrifuged and the polymer was air dried and analyzed by $^{13}C$ NMR. The fresh sample showed minimal ester alcoholysis and at most 2% propionamide formation.

The hydrolyzed, neutralized (basified) L-3/NVF copolymer was reanalyzed by titration after six months at room temperature and showed no titrable weak base amine. A fresh sample was hydrolyzed at 65° C. as before: $MeSO_3H$/MeOH based on 90% of NVF stoichiometry with distillation of methyl formate during reaction. Non-aqueous titration showed 1.3 meq/g of weak base. IR analysis showed 75% reduction in the formamide signal at 1675 $cm^{-1}$ and 25–30% reduction in the ester. Solid hydrolyzed polymer was redissolved in methoxypropanol, neutralized with CaO, and centrifuged to remove salts. A small amount of amide was observed at 640, 1570, 790 $cm^{-1}$ and the polymer solution was hazy. The neutralized polymer solution was heated in methoxypropanol at 60° C. for 2 h to simulate accelerated aging. After 10 min, partial polymer precipitation was observed. IR analysis showed a reduction in ester and the nonaqueous titration showed a significant shift in the titration curve from weak base mainly above pH 7 to pH 4 to 9, indicating loss of active amine.

EXAMPLE 3

Synthesis and Hydrolysis of VP/L-3/NVF Terpolymer

This example illustrates synthesis of terpolymer containing VP (vinyl pivalate) minor and amounts of L-3 (vinyl propionate) monomer and of higher molecular weight ($M_w$= 30,000) by running the reaction at 55° C.±2:

Starting with 300 g of ethanol solvent in the above reactor, VP (350.0 g, 61.6 mole %, 70 wt. %) and L-3 (100.0 g, 22.6 mole %, 20 wt. %) were fed during 4.0 hrs. NVF (50.0 g, 15.9 mole %, 10 wt. %) was diluted with 50 g of ethanol and fed during 4.15 hrs. VAZO 52 (10.85 g, 2.12 wt. %) was dissolved in 150 g of toluene and fed during 4.30 hrs. At the end of reaction, GC analysis indicated high conversion. Polymer properties were as follows:

| % Solids | Viscosity | MW | Tg | Gardner Color |
|---|---|---|---|---|
| 50.3% | 411 cps | 34,500 | 47° C. | <2 |

Hydrolysis of VP/L-3/NVF Terpolymer

The above polymer was hydrolyzed with $MeSO_3H$ in ethanol based on 80 mole of the NVF comonomer. Ethyl formate was removed by azeotropic distillation with ethanol during the hydrolysis. GC analysis indicated 97% ethyl formate removal. Titration analysis showed complete strong acid consumption after 4.5 hrs. The polymer solution was then neutralized with CaO to pH=10.5 and the solid precipitate was removed by centrifuging. A portion of neutralized polymer was air dried and analyzed by $^{13}C$ NMR, DSC and GPC. Conditions and results were as follows:

| Acid of Hydrolysis | Molar Ratio | pH after Neutralization | meqWB/g solids | Gardner Color |
|---|---|---|---|---|
| $MeSO_3H$ | 1.0/1.0 | 10.5 | 0.516 | ~6–8 |

DSC analysis showed a 7° C. increase in Tg of the hydrolyzed polymer, which agrees with expectation. $^{13}C$ nmr showed no measurable VP alcoholysis, 25% L-3 alcoholysis (4–5% total ester alcoholysis) and 67% NVF alcoholysis.

EXAMPLE 4 (Comparative)

Synthesis and Hydrolysis of butyl acrylate (BA)/methyl methacrylate (MMA)/NVF Solution Terpolymer This example shows that hydrolysis/basification of (meth)acrylate/NVF terpolymers (terpolymers disclosed in U.S.

Pat. No. 5,064,909) generates polymers with little or no reactive amine groups.

A 1 liter water jacketed reactor kettle containing 60 g of solvent (e.g., alcohol, ketone, alcohol/toluene) was equipped with a 2 blade mechanical stirrer, cold water condensor, nitrogen inlet, thermocouple, and a 1 liter constant pressure addition funnel containing 1.54 mole of NVF (100%)

1.88 mole of butyl acrylate 1.46 mole of methyl methacrylate 0.03 mole of dodecanethiol (a chain transfer agent)

430 g of solvent

Both the reactor and funnel contents were sparged with nitrogen for 30 minutes. The reactor was heated to 60° C. and the nitrogen sparge used for initial agitation. Initiator (2.78 wt. % on initial monomers of Vazo 52 was added to the monomer feed. The feed was added over 3 hours. Mechanical stirring (150 rpm) was started when the level in the reactor was high enough. The run was continued for an additional 7 hours at temperature. Additional initiator (0.3 wt. % on initial monomers), if needed, was added to finish the reaction. Final monomer concentrations after an additional 1 hour in the above run were <0.1%.

Conversions of the monomers were followed by using GC analysis (method attached). Relative comonomer conversion rates were very similar if molar acrylate levels were higher than methacrylate levels. Staged monomer feeds are required for NVF/all-methacrylate copolymers. Typical conversion ratios after approximately 3.5 hours were:

1.16:1.07:1.00 methyl methacrylate/butyl acrylate/NVF.

The resulting terpolymer was a slightly hazy pale yellow. Properties of this terpolymer were:

| | |
|---|---|
| $M_w$ | 19,700 |
| $M_n$ | 9,500 |
| $M_w/M_n$ | 2.1 |
| Tg | 16° C. |
| Solids | 35–45% |
| Brookfield visc | 4310 cps at 3 RPM |

Hydrolysis of the formamide groups of these polymers occured rapidly (room temperature) under base and slowly (~80° C.) under acid conditions. Unfortunately, in the base case, and in the acid case after neutralization, the product is predominately or exclusively the lactam arising from reaction of the amine with adjacent ester groups. Titration of neutralized samples showed little or no weak base amine functionality. Since NVF alternates strongly with acrylates and methacrylates, virtually all amine groups will have a neighboring ester group and form lactam on hydrolysis/basification.

EXAMPLE 5

Synthesis/Hydrolysis and Crosslinking of VP/vinyl 2-ethylhexanoate (2EH)/NVF Terpolymer In this run, VP (203.2 g, 1.64 mole), 2EH (36.9 g, 0.22 mole) and NVF (13.9 g, 0.19 mol) were charged into vessel reactor with 250 g of MeOH and 6.0 g of Trigonox 23. The reaction was heated to 64°±2° C. After 20 minutes VP (200.0 g, 1.6 mole) and 2EH (26.0 g, 0.15 mole) were delay fed over 1.5 hrs. NVF (51.3 g, 0.72 mole) was delay fed over 3.5 hrs. At the end of reaction, GC analysis indicated 12 wt. % of VP, 15 wt. % of 2EH and 14 wt. % of NVF did not react. Additional 5.0 g of initiator was added and heated for 4 hrs. 1% free monomers remained.

Polymer Analysis:

| % Solids | Tg | Mw | Viscosity | Gardner Color |
|---|---|---|---|---|
| 44% | 52° C. | 53,900 | 241 cps | ~1 |

GPC was done in 75% tetrahydrofuran (THF)/25% methanol/0.01 M NaAC mobile phase using universal calibration type and poly(methyl methacrylate) calibration standards.

The above polymer was hydrolyzed in MeOH with MeSO$_3$H. At the end of reaction, MeOH was replaced with Dowanol and neutralized with CaO to pH= 10.10. Nonaqueous titration analysis showed 0.24 meq/g solution of WB (0.60 meq/g solid) was obtained vs 0.59 meq/g solution theoretical meq. The polymer was crosslinking with epoxy resin 888H in Dowanol at RT. The result was gelation after 44 hrs.

Polymer Analysis:

| % Solids | Tg | Viscosity | Gardner Color |
|---|---|---|---|
| 40% | 60.2° C. | 443 cps | ~4 |

EXAMPLES 6–15

Examples 6–15 are VP/2EH/NVF terpolymers prepared and hydrolyzed via the basic method of Example 5 (Triginox 23=tertbutylperoxyneodecannoate).

Example 11 illustrates the synthesis of a low Tg version by use of more 2EH.

Example 12 illustrates the impact of low initiator on molecular weight during a larger scale reaction.

The specific conditions and results of these examples are set out in Table 1 below.

TABLE 1

| EXAMPLES # | Amount | VP/V-2EH/VAm Composition | Mw | PD | Viscosity | Tg | Gardner Color | Ash | meq/g solid NH$_2$ |
|---|---|---|---|---|---|---|---|---|---|
| 6 | 530.0 g | 72/8/20 $^{13}$C NMR 75/12/13 | 53,900 g/mole before hydrol. | 2.2 | 2875 cps in Dowanol at 50% | 60° C. | ~4 in MeOH | 0% | 0.60 meq/g solid X-link with epoxy 44 hrs |
| 7 Comb of 3 polymerizations | 3143.6 g | 70/8/22 feed composition | 47,300 g/mole | 3.3 | 327 cps (38.5 w/o) | 59.5° C. | ~7 | 4.25% | 0.62 X-link with epoxy 66 minutes |
| 8 | 861.7 g | 69/9.2/21.8 $^{13}$C NMR 71/12/17 | 53,600 g/mole | 3.1 | 1480 cps in MeOH before hydrolysis | 55.6° C. | ~9 | — | 0.55 meq/g solid |

TABLE 1-continued

| EXAMPLES # | Amount | VP/V-2EH/VAm Composition | Mw | PD | Viscosity | Tg | Gardner Color | Ash | meq/g solid NH$_2$ |
|---|---|---|---|---|---|---|---|---|---|
| 9 | 1782.0 g | 69.8/8.1/22.1 feed composition | 53,000 g/mole | 4.1 | — | 54.4° C. | ~8 | — | 1.02 2 weeks old |
| 10 Hydrolysis with H$_2$SO$_4$ | 1047.3 g | 69.8/8.1/22.1 feed composition | 46,000 g/mole | 3.2 | — | 59.5° C. | ~9 | 9.25% | 0.56 meq/g solid |
| 11 High amine content and low Tg for LW | 724.6 g | feed composition 42.1/28.6/29.3 | — | — | — | 21.9° C. | — | — | 1.19 meq/g solid |
| 12 High solids, 5L rxn, low initiator | 1384.7 g | 69.4/7.6/23 $^{13}$C NMR 64/10.9/25 | 80,000 g/mole | 4.6 | 638 cps at 33% solids in Dowanol | 65.1° C. | ~9 | 0.3% | 0.88 meq/g solid |
| 13 | 1421.0 g | 68.4/8.5/23.3 feed composition | 41,000 g/mole | 2.4 | ND | 50.2° C. | 8 | ND | 0.63 meq/g solid |
| 14 | 1430.4 g | 68/8/24 feed composition | 53,000 g/mole | 2.75 | ND | ND | ~7 | ND | 0.61 meq/g solid |
| 15 | 978.6 g | $^{13}$C NMR 73/12/15 | 50,200 g/mole | | 327 cps in Dowanol at 39% 2040 @ 50% solids | 47.5° C. | ~9 | 0.0% | 0.64 meq/g solid X-link with 888 H in ≦43½ hrs. |

EXAMPLE 16

This Example illustrates the preparation of an Ultra-Low Molecular-Weight Terpolymer using tetrahydrofuran (THF) as the solvent of polymerization and as a chain-transfer agent. The following reagents were charged into a 5-liter kettle reactor equipped with mechanical stirrer, reflux condenser and two feed pumps.

| Ingredient | wt./vol. |
|---|---|
| THF | 1800 g |
| VP | 750 g |
| 2-EH | 250 g |
| NVF | 70 g |
| Triga-NOX 23 | 15 g |

The above reagents were mixed at 62°±2° C. The temperature of reaction mixture went up to 70° C. (7° C. increase after addition of initiator). After 0.5-h of mixing, 110 g of NVF was delay fed over 3-h, 310 g of VP was delay fed over 2-h, 13 g of Triga-NOX 23 was added, and heating continued for an additional 3-h. The final product had MW of 7,000 g/mol and polydispersity of 2.0.

METHOD 2

SUSPENSION POLYMERIZATION

A second approach to preparing amine functional hydrophobic polymers is via a suspension bead process in water as the continuous phase. In this approach monomers of the above solution process are admixed with water, a suspending agent (preferably, medium MW PNVF), preferably with a chain transfer agent (most preferably, tetrahydrofuran at present), and with a radical initiator. The suspension of monomers is polymerized under an inert atmosphere with controlled stirring and, optionally, delay addition of additional monomers to control polymer uniformity (A delay of NVF in the case of higher vinyl esters). This gives a suspension of water insoluble beads of size 10 microns to 2 mm. In the case where significant quantities of a swelling chain transfer agent (such as tetrahydrofuran) is used, the chain transfer agent may then be distilled out to prevent coagulation which may occur if stirring is stopped and the sample is cooled before THF removal. The beads may be washed to remove water soluble suspending agents and byproducts. A peroxide (e.g. H$_2$O$_2$) may be added or the beads may be washed with aqueous H$_2$O$_2$ and transferred to clean water to reduce color on hydrolysis. In either case, they are then heated as a suspension in water, optionally in the presence of an organic swelling agent, to selectively hydrolyze the formamide groups.

The beads may be converted to the free base form directly by addition of base to the aqueous phase, optionally with additives such as organic swelling agents (e.g., lower alcohols), ammonia or an alkylamine to aid in conducting the neutralization across immiscible phases. The beads may then be heated to remove modifiers via distillation or azeotropic distillation. They may then be washed with water, separated via decantation or screening and optionally dried for storage and shipment. On dissolution in an organic solvent they are ready for use as amine functional components in a solvent borne coating.

Alternatively, the beads may be isolated before or after acid hydrolysis and dried. The dried beads may then be dissolved in an appropriate solvent and hydrolyzed with acid in a lower alcohol or converted to the free base form (as appropriate) as described in the original 2078 for the solution option.

Suspension Process

Only a few suspending agents have been investigated. No suspension was observed without a suspending agent; PVOH gave high coagulum. PNVF gave good suspension formation with no coagulum in the 0.1 to 1.0% usage rate on total monomers. Medium MW PNVF gave excessively small particle size suspensions that were too fine to filter properly, but low MW PNF gave suspension which filters well with no coagulum. Other suspending agents known to the art can also be used. Levels from 0.01% to 1% are useful.

For solution coatings applications, MW below 100,000 and preferably below 20,000 are preferred. Good molecular weights are readily obtained by using 5 to 80% THF, and preferably about 30% THF on total monomers other ethers (dioxane, ethylene glycol ethers, etc) and other drain transfer agents, such as thiols (dodeconethiol, etc), halocarbons and secondary alcohols (isopropanol, ettc) can also be sued alone or in combination.

When using THF at the above levels it is necessary to distill out the THF after the polymerization before cooling the reaction down or discontinuing stirring. This is done to suppress a tendency of the solvent swollen beads to coagulate.

Small amounts of salts, such as sodium chloride can be added to the runs; to modify the suspension, pH, or partitioning of monomers between phases 0.1 up to aqueous saturation are possible. Preferred salts are dodium, potassium, ammonium calcium, and magnesium salts of chloride nitrate acetate sulfate and phosphate.

Initiators can be thermal (azo, perester, percarbonate, etc) or redox (TBHP or hydrogen peroxide plus reducing agents such as formaldehyde sulfoxylate or erythorbic acid, with catalytic iron salts). Temperatures were all 60°–70° C., but higher and lower temperatures could be used with appropriate catalysts (30°–150° C., temperatures below 100° C. are preferred because of the thermal instability of NVF and the need for pressure equipment). An advantage of the suspension process is that monomer finishing is much more rapid and complete than with the solution process.

Monomers may be batch fed, semibatch,or continuous feed to adjust uniformity of monomer incorporation or molecular weight. Preferred are vinyl pivalate (VP) and vinyl 2-ethylhexanoate (2-EH) as hydrophobic comonomers. Other vinyl esters are preferred alternatives, especially vinyl neodecanoate and vinyl nonanoate Vinylamides such as N-vinylpyrrolidone and N-methyl-N-vinylacetamide are additional possibilities. Hydrophobic comonomer ratios are adjusted to achieve Tg's in any desired range (−30° to 85° C.); NVF levels and hydrolysis are adjusted to produce required amine levels (0.1 to 50 mole %, especially 3 to 20 mole %). Lesser amounts (≦25%) of other comonomers may be useful in improving Tg hydrolysis or other properties, e.g., vinylsulfonate salts, acrylate esters or acrylic acid, vinyl acetate, ethylene, vinyl propionate.

The beads can be washed with water after the polymerization to remove much of the suspending agent, but it may be desirable to leave the suspending agent in to aid in the subsequent hydrolysis.

EXAMPLE 17

Preparation of Low-Molecular-Weight Terpolymer

In a 5-liter reaction kettle fitted with mechanical stirrer, reflux condenser, thermometer, and an addition funnel, was added 1000 ml of distilled water containing 5.0 g of sodium chloride and 0.8 g of medium-molecular-weight poly(N-vinylformamide) as a suspending agent. Meanwhile a solution of 400 g of vinyl pivalate (VP), 60 g of vinyl 2-ethylhexanoate (2-EH), 50 g of N-vinylformamide (NVF), 250 g of tetrahydrofuran (as a co-solvent), 6 g of dodecylmercaptan (chain transfer agent) and 8 g of triganox-23 (initiator) was prepared. Both aqueous suspending and organic solutions were degassed with N2 for 0.5 h before mixing.

To the warm aqueous suspending agent was added the above organic mixture in one step. The stirred mixture was brought to 70° C. After 2 h, 6 g of triganox-23 in 50 ml of tetrahydrofuran was delay fed over 3 h. After addition was completed, heating was continued for an additional 3 h period. The residual monomer and THF was removed by stream distillation with agitation. The aqueous dispersion was cooled to room temperature under agitation. The polymer beads were filtered off and washed repeatedly with water to remove suspending agent. The polymer was dried under reduced pressure at 30° C. The dry product was a white powder. The product had a molecular weight of 18,000 g/mol and polymer dispersity of 2.7.

EXAMPLE 18

Preparation of High-Molecular-Weight Terpolymer

For this preparation, the procedure used was the same as that given in Example 17 except that the tetrahydrofuran (co-solvent) was not used with the reaction mixture. The final product had MW of 270,000 g/mol and polydispersity of 5. This run shows the strong effect of THF in lowering polymer molecular weight in a solution polymer.

EXAMPLE 19

Preparation of an Intermediate-Molecular-Weight Terpolymer

For this preparation, the procedure used was the same as that given in Example 17 except that the chain transfer agent n-dodecylmercaptan was doubled and no tetrahydrofuran was used. The final product had a MW on the order of 120,000 g/mol and polydispersity of 6.

EXAMPLES 20–26

Several additional runs were carried out to demonstrate the effects of process variables on suspension polymerization of vinyl pivalate (VP), vinyl 2-ethylhexanoate (2-EH) and N-vinylformamide. Table 2 below sets out the process variables and results for examples 17–26.

TABLE 2

| EXAMPLES # | $^{13}$CNMR mol % (VP/2EH/NVF) | MW | PD | Reaction Conditions | Comments |
|---|---|---|---|---|---|
| 17 | 68/8/24 | 22,000 g/mol | 2.9 | MMW PNVF(0.1 wt %) 30 wt % THF 1 wt % mercaptan | No coagulation Fine particles dewater poorly |
| 18 | 76/14/10 | 267,000 g/mol | 19 | PVOH as a suspending agent(0.5 wt %) No THF used 1 wt % mercaptan | High coagulum |
| 19 | 74/15/11 | 118,000 g/mol | 4.0 | MWW PNVF as suspending agent(0.5 wt %) No THF used | No coagulation |

TABLE 2-continued

| EXAMPLES # | $^{13}$CNMR mol % (VP/2EH/NVF) | MW | PD | Reaction Conditions | Comments |
|---|---|---|---|---|---|
| 20 | 73/18/9 | 18,000 g/mol | 2.9 | 4 wt % of n-Dodecylmercaptan Low MW PNVF used(1 wt %) 30 wt % THF | Fine particles dewater poorly No coagulation, good bead size |
| 21 | 74/14/12 | 17,000 g/mol | 2.7 | 1 wt % mercaptan Low MW PNVF(1 wt %) 30 wt % THF | No coagulation, good bead size |
| 22 | 72/14/14 | 15,000 g/mol | 2.7 | 1 wt % mercaptan Low MW PNVF(1 wt %) 30 wt % THF | No coagulation, good bead size |
| 23 | 75/15/10 | 19,000 g/mol | 2.7 | 1 wt % mercaptan Low MW PNVF(0.5 wt %) 30 wt % THF | No coagulation |
| 24 | 70/19/11 | 21,000 g/mol | 2.8 | 1 wt % mercaptan Low MW PNVF(0.2 wt %) 30 wt % THF | No coagulation |
| 25 | 74/12/14 | 18,000 g/mol | 2.7 | 1 wt % mercaptan MMW PNVF(0.2 wt %) 30 wt % THF | No coagulation |
| 26 | 75/11/14 | — | — | 1 wt % mercaptan MMW PNVF(0.1 wt %) 30 wt % THF 1 wt % mercaptan | Fine particles dewater poorly No coagulation Good bead size |

EXAMPLES 27

Polymer beads from Example 25 (100g) were dispersed in 200 g of DDl water, 10 g of MeSO$_3$H was slowly added. Propanol (50 g) was introduced into a 1-liter vessel reactor fitted with reflux condenser and placed in oil bath of 90° C. The solution was mechanically stirred for 7 h and amine formation was followed by non-aqueous base titration. At the end of the reaction, the beads were washed with water to remove unreacted acid and 1-propanol, redispersed again in aqueous sodium hydroxide solution (pH>12.0), stirred for a few hours, filtered, and washed with water to remove excess of NaOH and the salt product.

EXAMPLE 28

Polymer beads from Example 26 (65g wet) were dispersed in 150 g of DDl water, 8 g of MeSO$_3$H was slowly added. n-Butanol (50 ml) was introduced into a 1-liter vessel reactor fitted with reflux condenser and placed in oil bath at 110 ° C. The solution was mechanically stirred for 8 h and amine formation was followed by non-aqueous base titration. At the end of the reaction, the beads were washed with water to remove unreacted acid and 1-butanol and dried to off-white beads. Titration showed 0.4 meq/g amine acid salt, $^{13}$C nmr showed a molar ratio of VP/2-EH/NVF/VAmoHX of 0.736/0.119/0.075/0.07 (vs0.74/0.11$_6$/0.14$_6$/0 for the starting polymer). This gives a calculated amine level of 0.36 meq/g.

EXAMPLE 29

This example illustrates an effective method was developed to decrease the color of HVE/VAm terpolymer prepared by the solution process. This method can be used for both solution and suspension polymerization processes. This process involved bleaching with hydrogen peroxide (H$_2$O$_2$) or t-butyl hydroperoxide (TBHP) before acid hydrolysis. The amount of bleaching reagent used was 1–5 wt. % on polymer in solution or suspension system at high or low pH.

100 g of 40 wt. % polymer solution in MeOH was treated with 3 g of t-butyl hydroperoxide and stirred for 10 min at 65 ° C. At this time 6 g of MeSO$_3$H was added and the sample was stirred for an additional 4-h. The final product was neutralized with CaO and centrifuged to remove salts. The polymer had Gardner color <4 vs. 6 to 8 without peroxide treatment.

EXAMPLE 30

Polymer beads (60 g) were dispersed in 200 g of DDl water and 10 ml of 35 wt. % hydrogen peroxide solution was added. The sample was heated at 60° C. for 0.5-h, filtered, washed with water and hydrolyzed in MeOH/MeSO$_3$H system to give polymer with Gardner color <4 after neutralization.

EXAMPLE 31

To VP/2EHNAm (sample 13588-33, 1350 g), which contained 460 meq/g solution of amine, was added 1.4 g of acetic acid (23 meq of HOAc) stirred at room temperature. The pH of the starting material was 11.5 and the final product 10.5. The above sample was heated at 80° C. for 4-h. The amine value decreased by 20%, no significant further decrease was observed after a period of 6 months at room temperature. This example illustrates the fact that the chemmical treatment of the polymer with HOAc improves amine stability.

We claim:

1. A process for producing amine functional hydrophobic polymers which can be crosslinked through reaction of amine groups, said process comprising: polymerizing a vinylamide with one or more vinyl ester monomers selected from the group consisting of vinyl sec-alkyl carboxylates, vinyl tert-alkyl carboxylates and mixtures thereof to form a co- or terpolymer, hydrolyzing said co- or terpolymer under acid conditions, subsequently at least partially basifying said polymer to the free-base amine and removing byproduct salts and recovering said amine functional co- or terpolymer.

2. A process in accordance with claim 1 wherein said vinylamide is N-vinylformamide.

3. A process in accordance with claim 1 wherein said vinyl ester is a vinyl,2-ethyl hexanoate or a neo-acid vinyl ester.

4. A process in accordance with claim 1 wherein said co- or terpolymer has a molecular weight from 7,000 to 60,000 (Mw).

5. A process in accordance with claim 1 wherein said hydrolysis is carried out in an alcohol-containing solvent.

6. A process in accordance with claim 1 wherein said polymer is basified using CaO.

7. A process in accordance with claim 1 wherein said vinylamide is polymerized with said vinyl esters by free radical polymerization.

8. A process in accordance with claim 1 wherein said vinylamide and said vinyl esters are polymerized via a suspension bead process in water as the continuous phase.

9. A process in accordance with claim 1 wherein an oxidant is added to the polymer solution prior to carrying out the acid hydrolysis.

10. A process in accordance with claim 1 wherein said oxidant is t-butyl hydroperoxide or hydrogen peroxide.

11. A process in accordance with claim 1 wherein said hydrolysis is carried out using para-toluene sulfonic acid or methanesulfonic acid in a primary alcohol.

12. A process in accordance with claim 1 wherein said hydrolysis is carried out using an acid selected from the group consisting of sulfuric, methanesulfonic, hydrochloric and nitric acids.

13. A process in accordance with claim 1 wherein said vinylamide is polymerized with said vinyl ester monomer via suspension polymerization.

14. A process in accordance with claim 1 wherein said vinylamide is polymerized with said vinyl ester monomer via solution or emulsion polymerization.

15. A process in accordance with claim 1 wherein said byproduct salts are removed by precipitation, extraction into an immiscible phase, or high temperature hydrolysis/formate disproportionation.

16. A process in accordance with claim 13 wherein poly-N-vinylformamide is used as a suspending agent in the suspension polymerization.

17. A process in accordance with claim 16 wherein poly-N-vinylformamide is used in an amount from 0.01 to 1.0% based on monomers.

* * * * *